Sept. 10, 1935.  W. D. FOSTER ET AL  2,014,202
FILM HANDLING APPARATUS AND FOOTAGE RECORDING DEVICE THEREFOR
Filed March 23, 1933
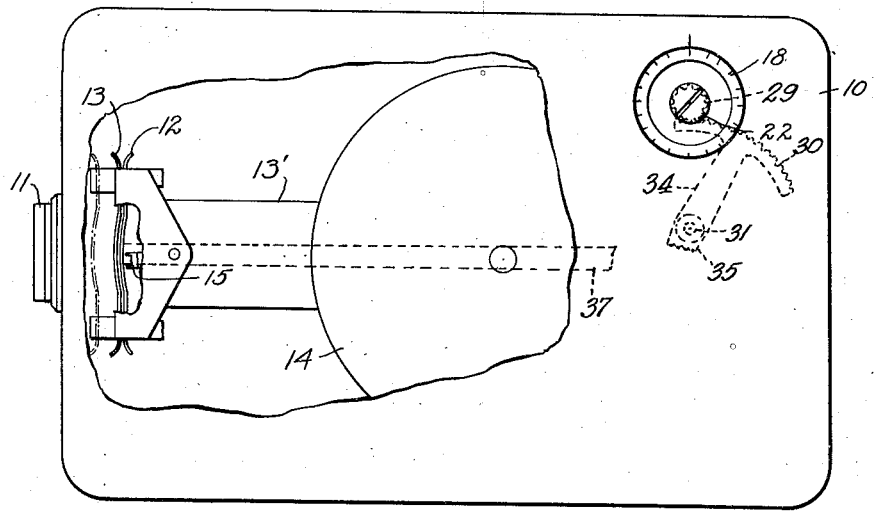
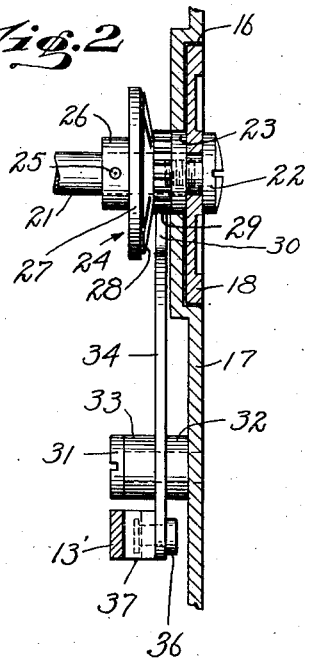
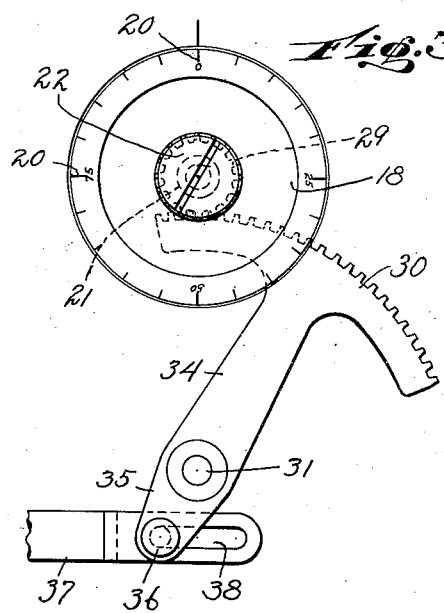
INVENTORS.
WARREN DUNHAM FOSTER.
FREDERICK DAVENPORT SWEET.
BY Warren D. Foster
ATTORNEY.

Patented Sept. 10, 1935

2,014,202

UNITED STATES PATENT OFFICE 2,014,202

FILM HANDLING APPARATUS AND FOOTAGE RECORDING DEVICE THEREFOR

Warren Dunham Foster, Washington Township, Bergen County, N. J., and Frederick Davenport Sweet, New York, N. Y., assignors, by direct and mesne assignments, to Kinatome Patents Corporation, a corporation of New York Application March 23, 1933, Serial No. 662,377

17 Claims. (Cl. 88—16)

The present invention is applied broadly to the art of photography and more particularly to apparatus for the taking or projection of pictures but it will be readily understood that it can be applied to many other purposes. This invention relates generally to motion picture apparatus, whether cameras or projectors, and more particularly to film meter means for such apparatus which indicate how much of a reel of film has been exposed at a particular moment.

It is very desirable for the user of a motion picture camera to have a film meter thereon which indicates the amount of film exposed and the amount of film still in the machine to be exposed; and in using such a meter it is important that it be set back to zero every time a fresh roll of film is inserted in the camera. Many users of motion picture cameras, especially amateurs, fail at times to set their film meter back when a new reel of unexposed film is inserted in the camera. As one result from this oversight, the operator does not know how much film has been exposed at any particular time, and may try to take pictures of an important event and find before many exposures have been made that he is out of film and has thus failed to obtain the complete photographic record which he desires. Often before he can reload, it will be too late to secure the remainder of the desired pictures. On the other hand, where the meter is not set back to zero the user may be over-cautious and fail to take pictures of an interesting subject because he thinks that he has too little film in his camera. Also he may send a roll of partly exposed film to be developed and thereby lose much of the cost of the film roll.

It is an object of the present invention to provide automatic means which will insure that the film meter is necessarily set back to zero each time a new roll of fresh film is mounted in the machine in operative relation to the feeding means.

It will be readily understood by those skilled in the art that the present invention is of particular usefulness in view of the fact that film reels containing different lengths of film thereon are in commercial use. In the amateur field, for example, both 50-foot and 100-foot 16 millimeter reels for negative film are in common use. In an apparatus which is supplied with a film registering device of the conventional type in which the meter must be set back to zero by hand, unless 100 feet has been used and the dial moved through a complete revolution and back to zero, if the user successively places two 50-foot reels of film, for example, in operation in the camera he may forget to re-set the footage recording device and consequently will not have an accurate record of the footage which has been exposed. The mere subtraction of 50 feet from the total shown after he has inserted the second reel will not give an accurate figure in view of the paper trailer and leader which is commonly attached to the end and beginning of two reels respectively. In film registering devices allowance is ordinarily made for the paper leader, but obviously in a machine which is adapted to the mounting of either 50-foot or 100-foot reels, no such allowance can be made between reels—that is to say, for the trailer at the end of the first reel and the leader at the beginning of the second reel. Such difficulties, however, are avoided by the use of this construction.

When a fresh roll of film is inserted in a motion picture camera and operatively positioned therein, it is necessary in most cameras that a movable gate section be opened and closed for removing the exposed roll of film and operatively positioning a fresh roll of film in the camera. It is a further object of our invention to provide means in a motion picture camera operatively connecting the movable gate section and a film meter on the camera which will necessarily set the meter back to zero when the movable gate section is opened and closed.

The means described and claimed in this application may be varied from the structure specifically shown and described herein and be used with practically all types of motion picture cameras, and especially those which have a gate which is opened for threading film through the gate as when a new roll of film is inserted in the camera. The invention is illustrated in connection with a gate structure having a section which is movable directly away from the fixed gate section, and in practicing my invention devices are provided for connecting the registering element of a film meter in such a way that each time the movable gate section is moved to open position and back to closed position the film meter is set back to zero. It can be readily seen as the description proceeds that the principle of operation of the invention may be employed in cameras having movable gates hingedly mounted with respect to the fixed gate section.

In this description our invention is illustrated as applied to the camera, but it will be readily understood that it is equally well adapted to projecting devices which now often include, or should include, film registering means so that the operator can be certain how much film remains to be fed or has already been fed so that he can prepare for the "change over" to the next reel.

While we have shown only one form of the invention in the accompanying drawing which forms a part of this specification, the invention may take other forms without departing from the the spirit of the invention or the scope of the broader claims.

Figure 1 is a side view of a motion picture camera, broken away in part, which illustrates diagrammatically one of the many types of gate which may be used in practicing our invention.

Figure 2 is a side view, broken away in part, of a film meter and mechanism for connecting it with a movable gate section.

Figure 3 is a partial front view of the structure shown in Figure 2.

In carrying out our invention, a motion picture camera having a housing 10 and a usual objective lens device 11 may be provided with a fixed gate section 12 and a movable gate section 13. The fixed gate section 12 may be supported by parts of the camera not shown and the movable gate section 13 may be mounted for movement in parallelism away from and toward the fixed gate section 12 on a sliding plate 13' which may be mounted for longitudinal movement by means not shown. As is obvious to those skilled in the art, the movable gate section 13 acts as a presser member. It will be understood as the description proceeds that the specific means for mounting the gate section 12 and the construction of the feeding means need not be described herein for an understanding of the present invention. If desired, this gate structure may be of the type described and claimed in the co-pending application of Barton Allen Proctor, Serial Number 187,980, filed April 30, 1927, now Patent Number 1,944,033, but we are in no way limited to any particular form of gate. The film may pass from a delivery reel 14 of well known construction over the upper end of the gate section 12 and be fed through the gate by means including a claw member 15 of well known construction. A take-up reel, not shown, may be placed in co-axial relation to the delivery reel, and conventional delivery and take-up sprockets or the Bundick and Proctor tension control system may be employed.

In a circular recess 16 provided in a side wall 17 of the housing 10 there may be mounted a meter disc 18 having a dial with indicia 20 of well known kind. Appropriately placed figures may show the footage of the film remaining to be fed or that which has been fed. For operatively rotating the disc 18, it may be loosely mounted on the end portion of a shaft 21 which extends inwardly through the wall 17. A screw 22 threaded in the end of the shaft holds the disc thereon. The disc 18 may have a hub 23 which extends inwardly through the wall 17, the hub being revolvable relative to the shaft 21. The shaft 21 may be operatively connected to the film feeding means of the camera by mechanism such as is disclosed in the co-pending application of Frederick Davenport Sweet, Serial Number 465,986, filed July 7, 1930, which upon January 16, 1934, matured as Patent Number 1,944,038, or by any other suitable or well known means.

To have the disc revolve with the arbor 21 a friction spring washer device generally designated as 24 may be mounted on the arbor 21 as by a pin 25 which will pass through a hub 26 integrally joined to a collar member 27, on which collar may be mounted leaf springs 28 in a well known way for frictionally engaging against the end of the hub 23.

The hub 23 may be formed with teeth 29 (Figure 3) for engagement with an arcuate rack member 30 which may be pivotally mounted on a screw 31 threaded in a boss 32 integral with the wall 17. A collar 33 may be disposed between the head of the screw and the radial lever member 34 which extends from the rack 30 to the pivot screw 31. The peripheral length of the rack 30 preferably slightly exceeds the periphery of the hub 23, and when the film meter is set at zero as illustrated in Figure 3 one end portion of the arcuate rack 30 will be disposed in engagement with the teeth of the hub 23. The lever 34 may have a short extension 35 on the opposite side of the pivot screw 31 and have a pin 36 fastened in this extension. A link member 37 may extend from a suitable connection with the movable or sliding plate 13' of the gate section 13 to a point below the pivot screw 31 and be provided with a lengthwise slot 38 in which the pin 36 is disposed.

In the operation of our film meter set-back device, the graduated disc 18 will be revolved clockwise as the film is fed, and in the starting or zero position of the disc, the rack 30 and pin 36 are preferably disposed as shown in Figure 3. The lengths of the levers 34 and 35 and the slot 38 are such that upon a full revolution of the disc 18 as when a full roll of film has been fed through the camera the pin 36 will be moved to the right end of the slot 38 as viewed in Figure 3. The movement of the movable gate section 13 is preferably such that as it is opened, as for the purpose of removing the exposed roll of film from the camera, the pin 36 and the rack 30 are swung to the Figure 3 position and the disc 18 is reversely rotated through a full revolution. When a new roll is inserted and the gate 13 moved to its operative Figure 1 position the link 37 and slot 38 therein are moved to the right without affecting the pin 36 or the rack 30 and without moving the disc 18 from a zero position. Then upon the beginning of the feeding of a new roll of film the pin 36 will begin to be swung to the right in the slot 38 as viewed in Figure 3. If for example, only a half a roll of film is exposed and it is desirable to remove it and have it developed the opening of the gate 13 will move the link 37 idly over a portion of its travel, but during the latter part of its travel will be effective to swing the rack 30 so as to return the disc 18 to zero.

It can be readily seen by those skilled in mechanics that by connecting the link 37 to the gate 13 through a suitable lever system, the gate may be moved a lesser amount than the necessary movement of the link 37 for setting the disc back to zero. Should such a construction be convenient it will not objectionably increase the power required for setting the disc back since a very small amount of power acting on the link 37 will operatively move the rack bar 30 and the disc 18. Therefore to even double that power would not add appreciably to the effort of the user of the camera in opening the gate.

In the apparatus which we are showing and describing as illustrative of our invention the dial is returned to zero by the opening of the gate, that is to say, by the movement of the presser member 13 away from the teeth 15. It will be readily understood, however, that the reverse of this construction could be readily employed without departing from the scope of our invention.

Therefore in the subjoined claims it will be understood that wherever we speak of the opening or closing of the gate or the movement of the presser member in one direction, the opposite operation may be substituted.

Many of the advantages of our invention will be apparent from the previous portion of this specification, the attached drawing, and the subjoined claims.

Various devices have been recently proposed in which a film registering device is operated by means which ride upon the surface of the film as it is fed. Such devices are objectionable in that they require a separate manual manipulation each time a film is introduced into the apparatus, and, they place upon the delicate film an additional burden and also tend to scratch the surface. An advantage of our invention is that it does away with these serious difficulties. Other advantages include the provision of automatic means for predeterminedly setting a film registering device in accordance with the movement of the gate or presser member thereby setting the registering device anew each time a film is placed in operation in the apparatus.

We claim:

1. In a motion picture apparatus, a film registering device including a dial, a gate, means for opening and closing said gate, and means interconnected with said gate necessarily operative concomitantly with the operation of said previously stated means for setting said dial to a predetermined point.

2. In a motion picture apparatus, a film registering device including a dial, a gate, means for opening and closing said gate, and a connection between said means and said film registering device for setting said dial at a predetermined point upon the operation of said means.

3. In a motion picture apparatus, a film registering device including a dial, a member for feeding a film through said apparatus, a movable presser member for placing the film in operative relation to said feeding member, and means operatively interconnected with said presser member necessarily operative concomitantly with a predetermined movement of said presser member for setting said registering device at a predetermined point.

4. In a motion picture apparatus, a film registering device including a dial, a member for feeding a film through said apparatus, a presser member for placing the film in operative relation to said feeding member, means for moving said presser member away from said feeding member thereby freeing the film therefrom, and a connection between said moving means and said registering device for setting said dial at a predetermined point upon such movement of said presser member.

5. In a motion picture apparatus, a footage registering device including a dial, an openable gate, means for feeding a film through said gate, a connection between said feeding means and said dial for moving said dial in one direction in accordance with the operation of said feeding means, and a connection between said gate and said device for moving said dial in the other direction upon the opening of said gate.

6. In a motion picture apparatus, a footage registering device including a dial, an openable gate, said gate comprising a relatively fixed section and a section movable relatively thereto, means for feeding a film through said gate, an operative connection between said feeding means and said dial for moving said dial in one direction in accordance with the operation of said feeding means, and an operative connection between said movable gate section and said dial for moving said dial in the other direction upon the movement of said movable section.

7. In a motion picture apparatus, a footage registering device including a dial, a feeding member, a connection between said feeding member and said dial for moving said dial in one direction in accordance with the operation of said feeding member, movable presser means associated with said feeding member, and a connection between said presser means and said device for moving said dial in the other direction upon the movement of said presser means.

8. In a motion picture apparatus, a footage registering device including a dial, a member for feeding a film through said apparatus, means for operating said dial in accordance with the amount of film which has been fed by said feeding member, a movable member adapted for pressing the film into operative relation with the teeth of said feeding member, and means operatively interconnected with said presser member for setting said dial to zero necessarily operative in timed relation to a predetermined movement of said presser member with relation to said feeding member.

9. In a motion picture apparatus having means for guiding a film along a path past the optical axis of the apparatus, a film meter, toothed means for feeding a roll of film through said apparatus along said film path past said axis, means associated with said feeding means and operatively movable for bringing a portion of a fresh roll of film into correct operative relation with said feeding means, and means operatively interconnected with said meter and said means for bringing said fresh roll of film into correct relation with said feeding means for necessarily setting said film meter at a predetermined starting point upon the operation of said means for bringing said fresh roll of film into operative relation with said feeding means.

10. In a motion picture apparatus, in combination, a film meter, an openable gate including a movable gate section, and a connection between said movable gate section and said film meter for setting said film meter to zero each time said movable gate section is moved for the purpose of opening the gate of said apparatus.

11. In a motion picture apparatus, in combination, a gate having a fixed section and a movable section, a film meter, means for moving said movable section away from said fixed section for opening said gate for threading a film through said gate, and a connection between said film meter and said movable section for setting said film meter to zero each time said gate is opened and closed for threading the film therethrough.

12. In a motion picture apparatus, a film meter, a film meter disc, a first means for operatively rotating said disc, said rotating means including an arbor and a friction connection between said arbor and said disc, a second means for rotating said disc for setting said meter to zero, said second means including a pinion connected to said disc, an arcuate rack meshing with said pinion, an openable gate including a movable gate section, and a connection between said movable gate section and said rack for rotating said disc a sufficient amount to return it to zero position when said movable gate section is moved for threading a film through the gate of said apparatus.

13. In a motion picture apparatus, a film meter, said film meter including a dial, a first means for operatively rotating said dial, said first rotating means including an arbor and a friction connection between said arbor and said dial, a member for feeding a film through said apparatus, a connection between said feeding member and said arbor for operating said first rotating means in accordance with the amount of film fed by said feeding member, and a second means for operatively rotating said dial in a reverse direction for setting said meter to zero against the force of said friction connection, said second means including a pinion connected to said dial, a toothed member meshing with said pinion, and means for moving said toothed member.

14. In a motion picture apparatus having a housing, a film meter, said film meter including a dial, a first means enclosed within said housing for operatively rotating said dial in one direction for indicating the amount of film used, and a second means enclosed within said housing for operatively rotating said dial in the other direction, said second rotating means including gear means connected to said dial and movable therewith, driving means for rotating said gear means, and a lost motion device between said driving means and said dial whereby the rotation of said gear means in a non-operative direction following the operation of said first rotating means is free of interference with said driving means.

15. In a motion picture apparatus having a housing, a film registering device including a dial, a first means enclosed within said housing for rotating said dial in one direction for indicating the amount of film used, and a second means enclosed within said housing for rotating said dial in the other direction, said second rotating means including driving means for said dial and a lost motion connection between said driving means and said dial whereby the movement of said dial in said first mentioned direction under the influence of said first rotating means is free of interference with said driving means.

16. In a motion picture apparatus having a housing, a film registering device, said device including a dial, a first means enclosed within said housing for rotating said dial for indicating the amount of film used, a second means enclosed within said housing for rotating said dial, said second means including a pinion connected to said dial, a toothed member meshing with said pinion, means for operating said toothed member, and a lost motion connection disposed between said operating means and said dial whereby the movement of said dial under the influence of said first rotating means is free of interference with said operating means.

17. In a motion picture apparatus having a normally closed housing and means for opening said housing for operatively mounting therein a roll of film, means for feeding film from said roll, means for pressing the film into engagement with said feeding means, a film footage indicator device mounted on an external face of said housing, means disposed interiorly of said housing for operating said indicator device in accordance with the amount of film fed by said feeding means, and means operable for setting said indicator device to a predetermined starting point concomitantly with the mounting of a new roll of film in said apparatus, said last named means including a connection between said indicator device and said film pressing means, said setting means being disposed interiorly of said housing so as to be incapable of operation from the exterior of said closed housing.

WARREN DUNHAM FOSTER.
FREDERICK DAVENPORT SWEET.